(12) United States Patent
Lu

(10) Patent No.: US 6,227,363 B1
(45) Date of Patent: May 8, 2001

(54) INDIVIDUAL CD FILE

(75) Inventor: Sung-Tien Lu, Taipei Hsien (TW)

(73) Assignee: Chin Ta Industrial Co., Ltd., Taipei (TW)

(*) Notice: Subject to any disclaimer, the term of this patent is extended or adjusted under 35 U.S.C. 154(b) by 0 days.

(21) Appl. No.: 09/521,464

(22) Filed: Mar. 8, 2000

(30) Foreign Application Priority Data

Mar. 9, 1999 (TW) .............................................. 088203521
Sep. 16, 1999 (TW) ...................................... 088203521-A01

(51) Int. Cl.[7] .................................................. B65D 85/57
(52) U.S. Cl. ........................................ 206/308.1; 206/310
(58) Field of Search .................................... 206/303, 307, 206/308.1, 308.3, 309, 310

(56) References Cited

U.S. PATENT DOCUMENTS

| | | | | |
|---|---|---|---|---|
| 4,084,690 | * | 4/1978 | Pulse | 206/310 |
| 4,874,085 | * | 10/1989 | Grobecker et al. | 206/309 |
| 4,903,829 | * | 2/1990 | Clemens | 206/310 |
| 5,361,903 | * | 11/1994 | Thiele | 206/310 |
| 5,713,463 | * | 2/1998 | Lakoski et al. | 206/308.1 |
| 5,894,924 | * | 4/1999 | Koch | 206/310 |
| 6,021,864 | * | 2/2000 | Lakoski et al. | 206/308.1 |
| 6,029,848 | * | 2/2000 | Cha et al. | 206/308.1 |

* cited by examiner

Primary Examiner—Jim Foster
(74) Attorney, Agent, or Firm—Rabin & Champagne, P.C.

(57) ABSTRACT

An individual CD file having two a first shell and a second shell hinged together, wherein the first shell has a split hub at the center, a keeper disposed around the hub for holding a CD, an annular recess disposed around the keeper corresponding to the size of a CD, a bearing flange disposed around the inner diameter of the annular recess for supporting the loaded CD, and a peripheral flange disposed around the outer diameter of the annular recess for keeping the loaded CD in place; the second shell has a socket at the center for receiving the hub of the first shell to hold the two shells in a closed position, an annular recess disposed around the socket corresponding to the annular recess in the first shell, a bearing flange disposed around the inner diameter of the annular recess for supporting the CD being fastened to the keeper of the first shell, and a peripheral flange disposed around the outer diameter of the annular recess of the second shell.

7 Claims, 7 Drawing Sheets

INDIVIDUAL CD FILE

BACKGROUND OF THE INVENTION

The present invention relates to an individual CD file, and more particularly to a compact individual CD file injection-molded from plastics.

A variety of CD storage apparatus have been disclosed, and have appeared on the market. FIG. 7 shows an individual CD storage case according to the prior art. This structure of individual CD storage case comprises two shells hinged together, and a CA carrier coupled to the shells on the inside for holding two CDs at two opposite sides. This structure of individual CD storage case is expensive. The assembly procedure of this structure of individual CD storage case is complicated. Further, the parts of this structure of individual CD storage case tend to be damaged when loading or unloading a CD. FIG. 8 shows a CD pack according to the prior art. This structure of CD pack is cheap, however it cannot hold loaded CDs firmly in place.

SUMMARY OF THE INVENTION

According to one aspect of the present invention, the individual CD file comprises a first shell and a second shell hinged together, wherein the first shell comprises a hub at the center, a keeper disposed around the hub for holding a CD, an annular recess disposed around the keeper corresponding to the size of a CD, a bearing flange disposed around the inner diameter of the annular recess for supporting the loaded CD, and a peripheral flange disposed around the outer diameter of the annular recess for keeping the loaded CD in place; the second shell has a socket at the center for receiving the hub of the first shell to hold the two shells in a closed position, an annular recess disposed around the socket corresponding to the annular recess in the first shell, a bearing flange disposed around the inner diameter of the annular recess for supporting the CD being fastened to the keeper of the first shell, and a peripheral flange disposed around the outer diameter of the annular recess of the second shell. According to another aspect of the present invention, the hub of the first shell is a split hub having peripheral flange for positive positioning in the socket at the second shell. According to an alternate form, both shells have a respective keeper for holding a CD respectively.

DETAILED DESCRIPTION OF THE PREFERRED EMBODIMENT

Figure 1:
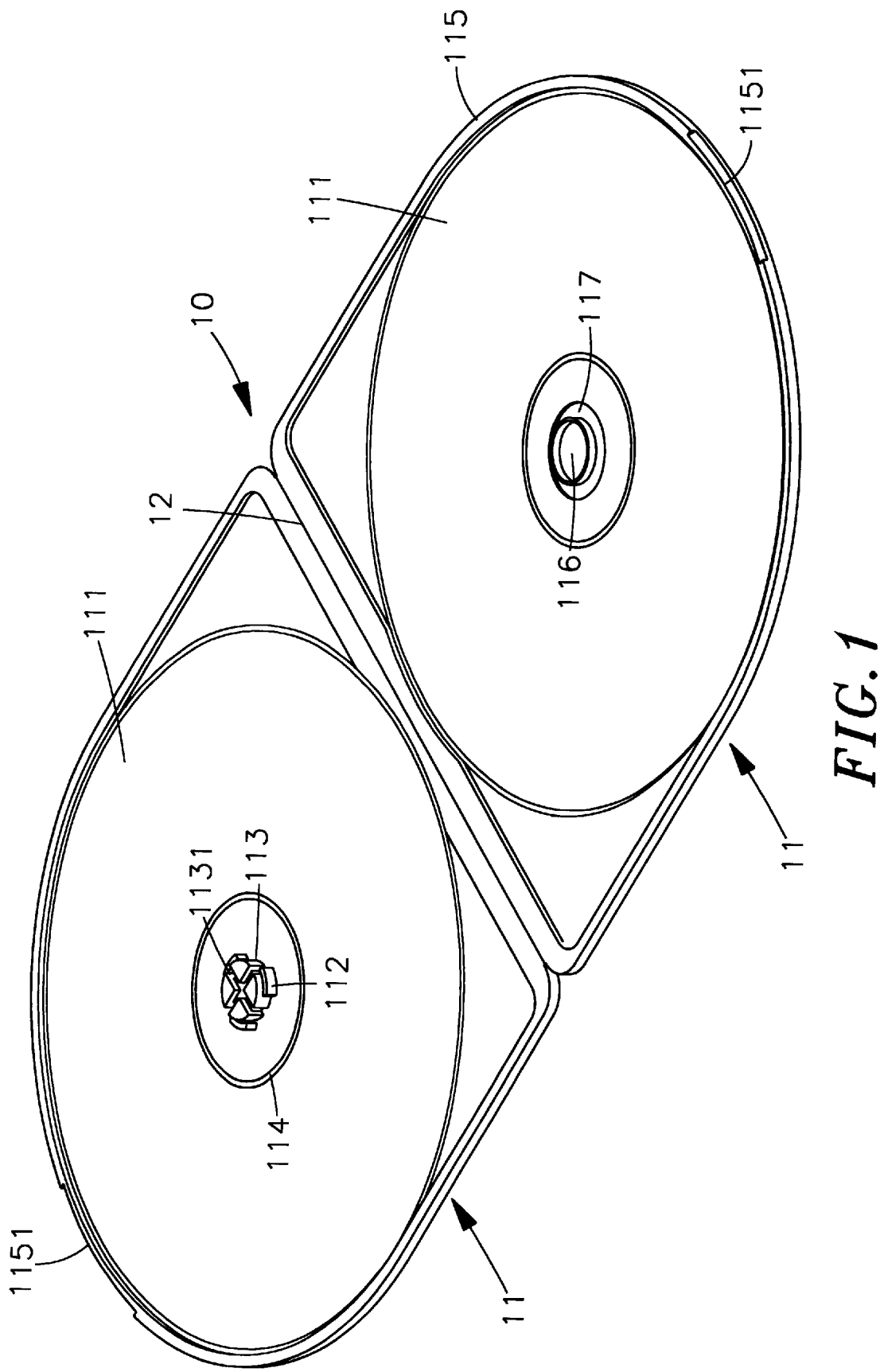
FIG. 1 is an extended-out view of an individual CD file according to a first embodiment of the present invention.
Figure 2:
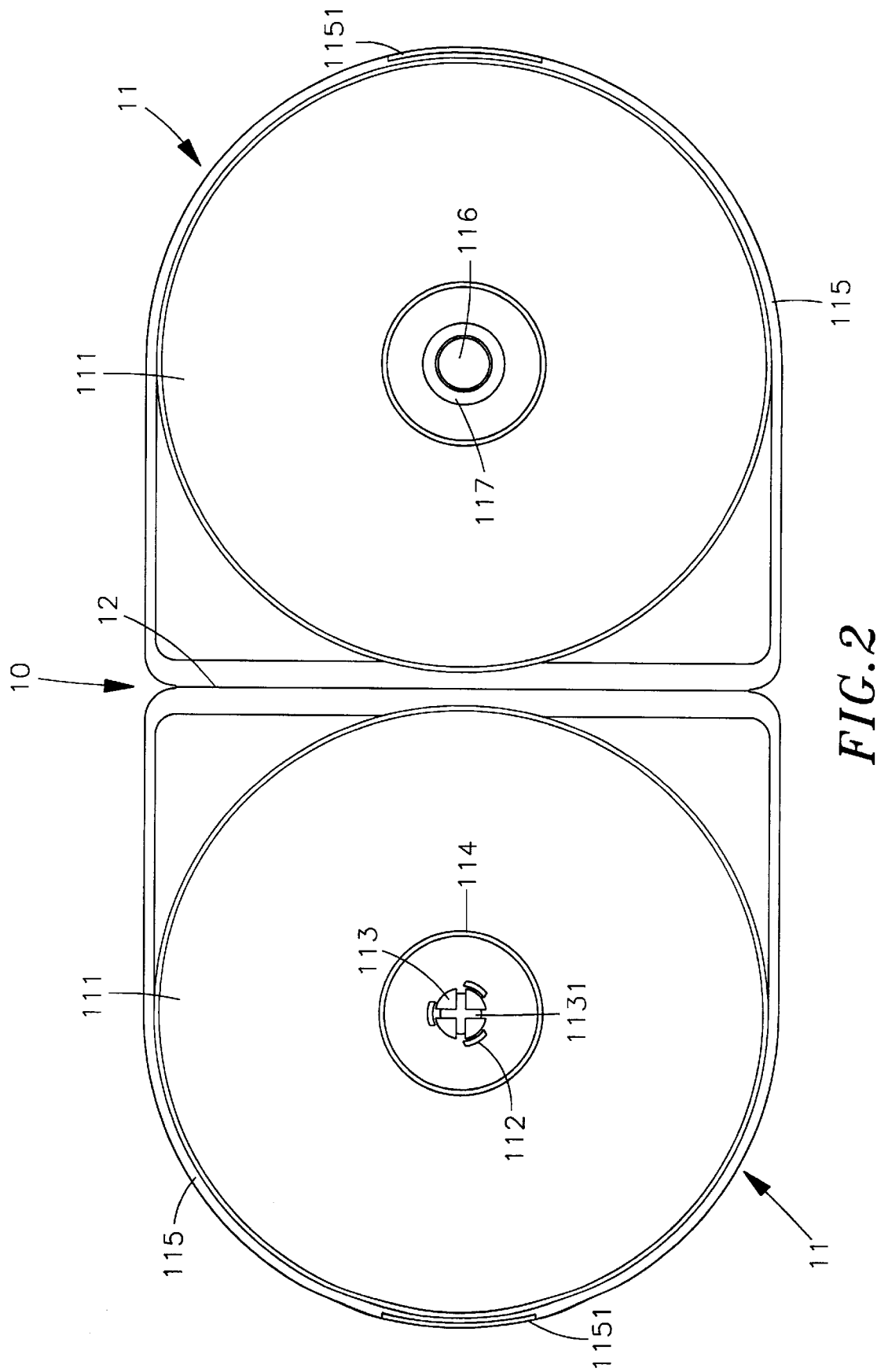
FIG. 2 is a top view of FIG. 1.
Figure 3:
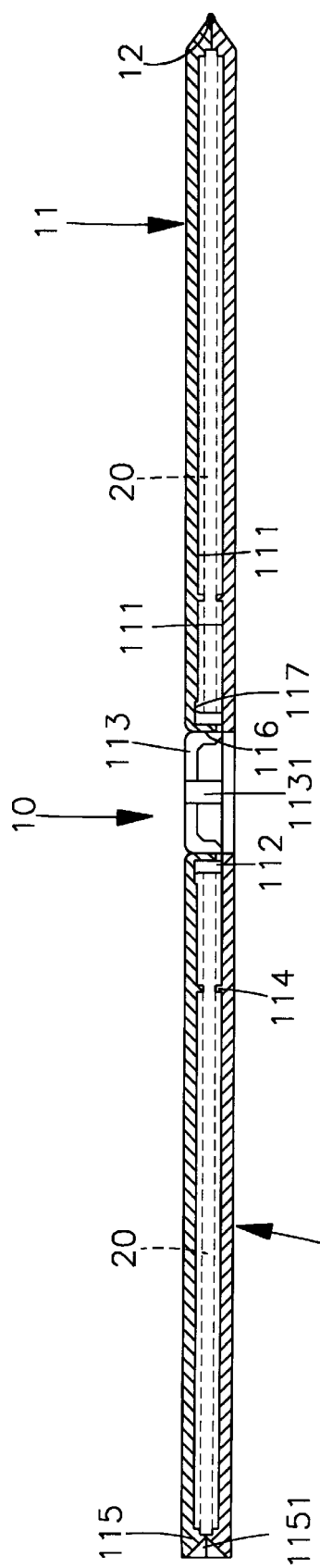
FIG. 3 is a sectional view of a part of the first embodiment of the present invention, showing a CD fastened to the keeper in one shell of the individual CD file.
Figure 6:
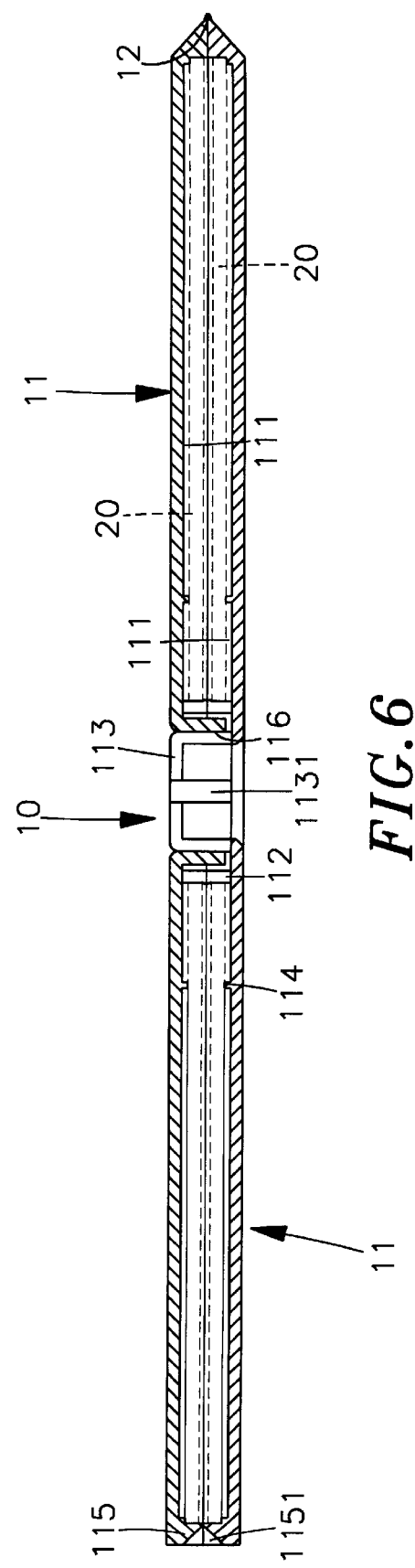
FIG. 6 is a sectional view of a part of the second embodiment of the present invention, showing a CD fastened to the keeper in one shell of the individual CD file.
Figure 4:
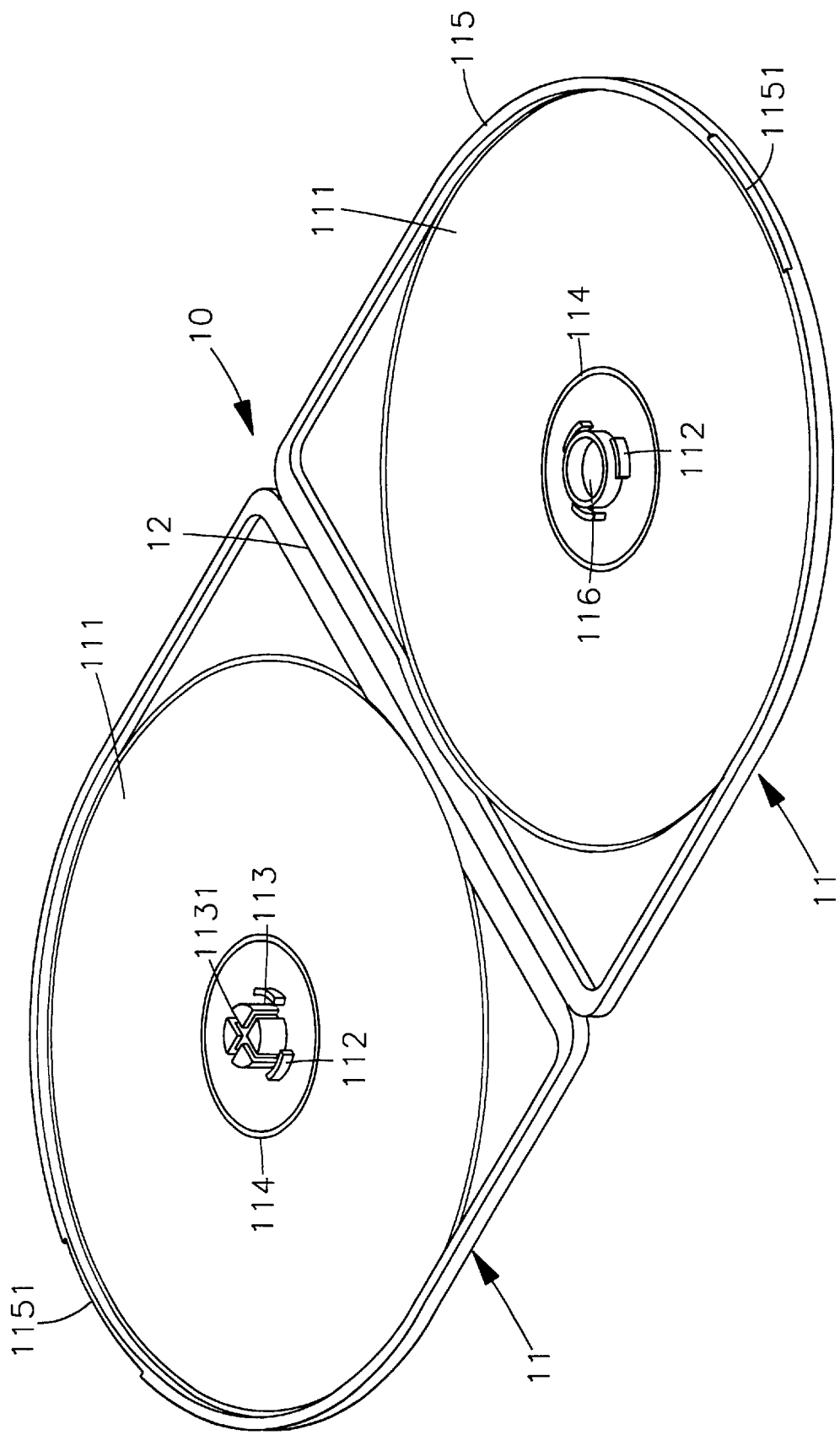
FIG. 4 is an extended-out view of an individual CD file according to a second embodiment of the present invention.
Figure 5:
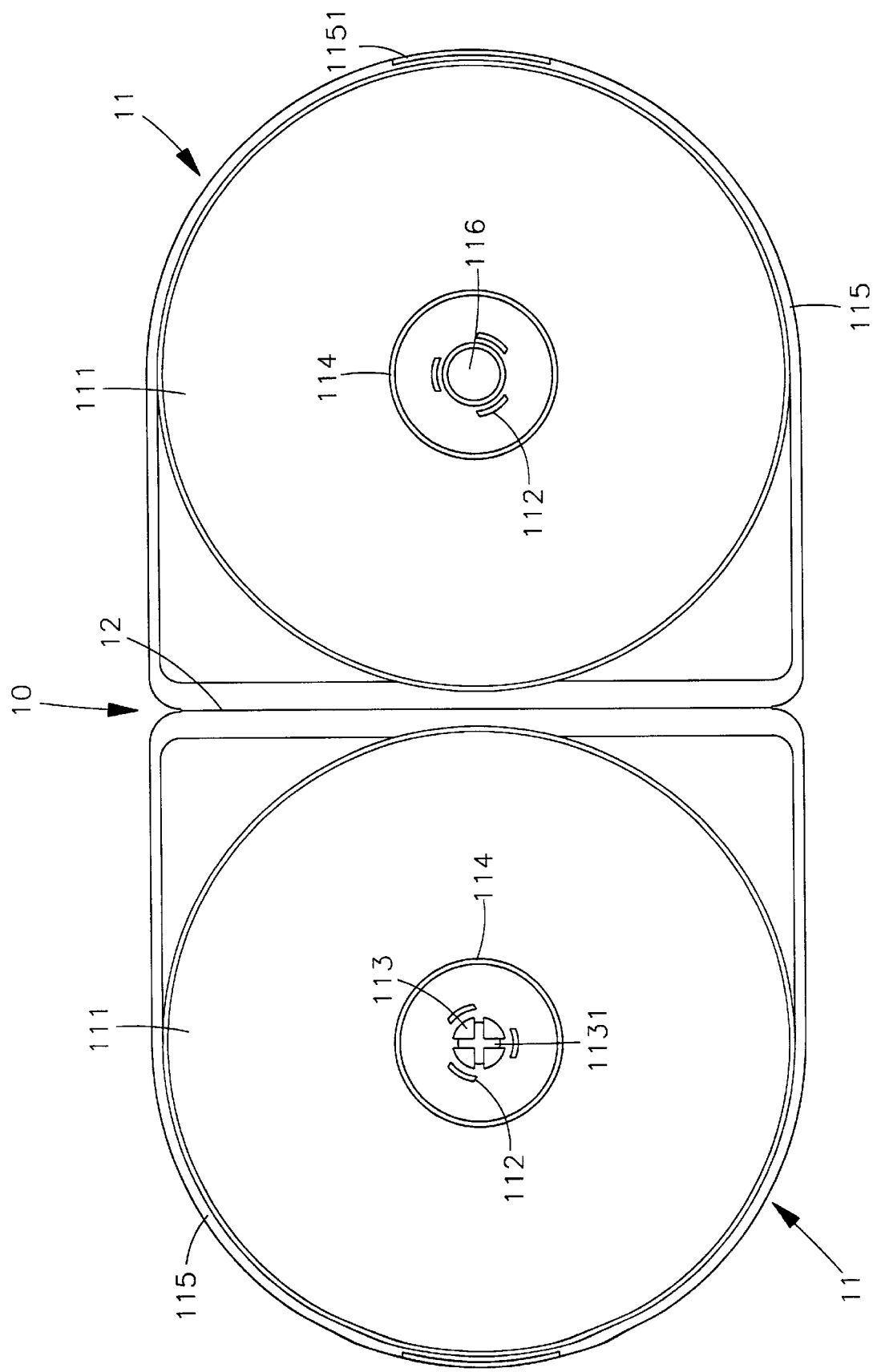
FIG. 5 is a top view of FIG. 4.
Figure 7:
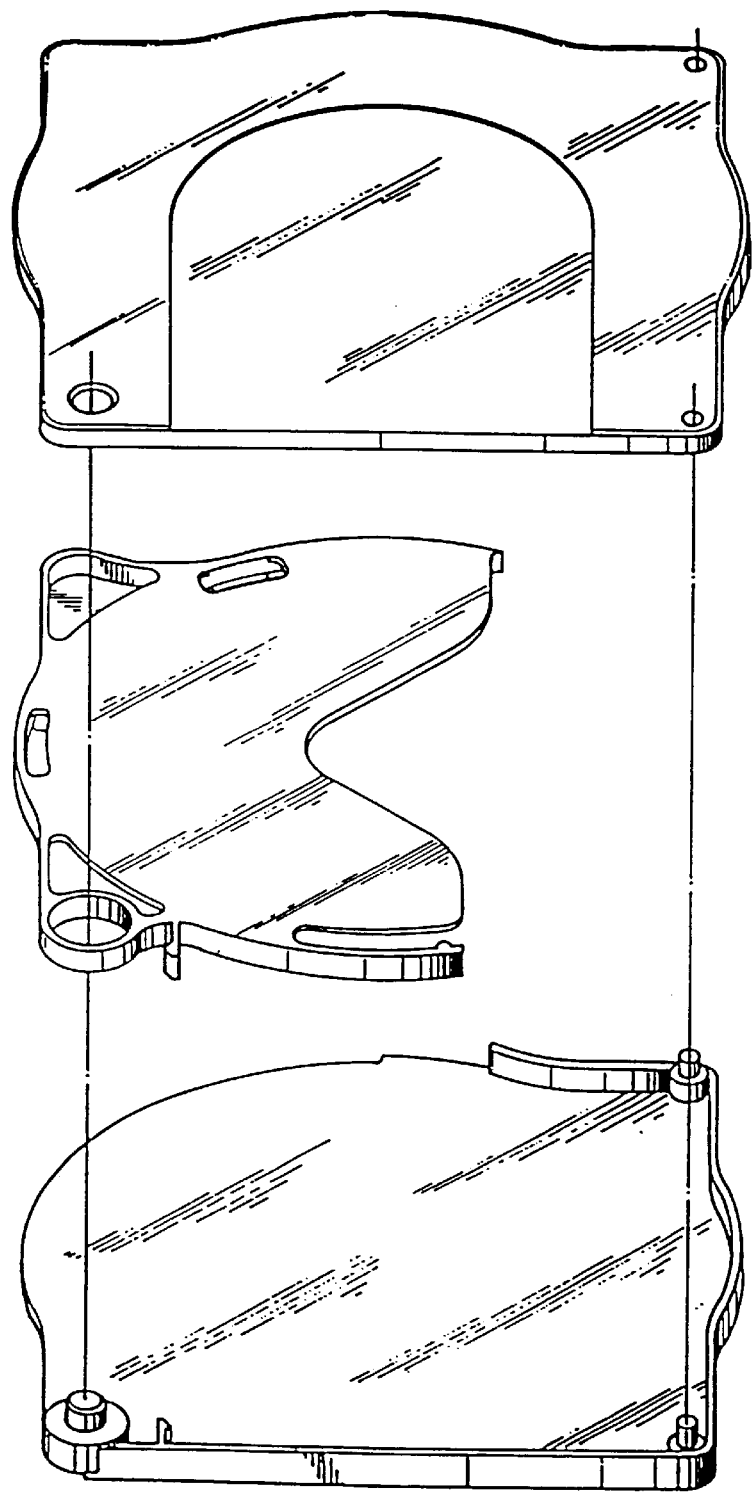
FIG. 7 is an exploded view of an individual CD box according to the prior art.
Figure 8:
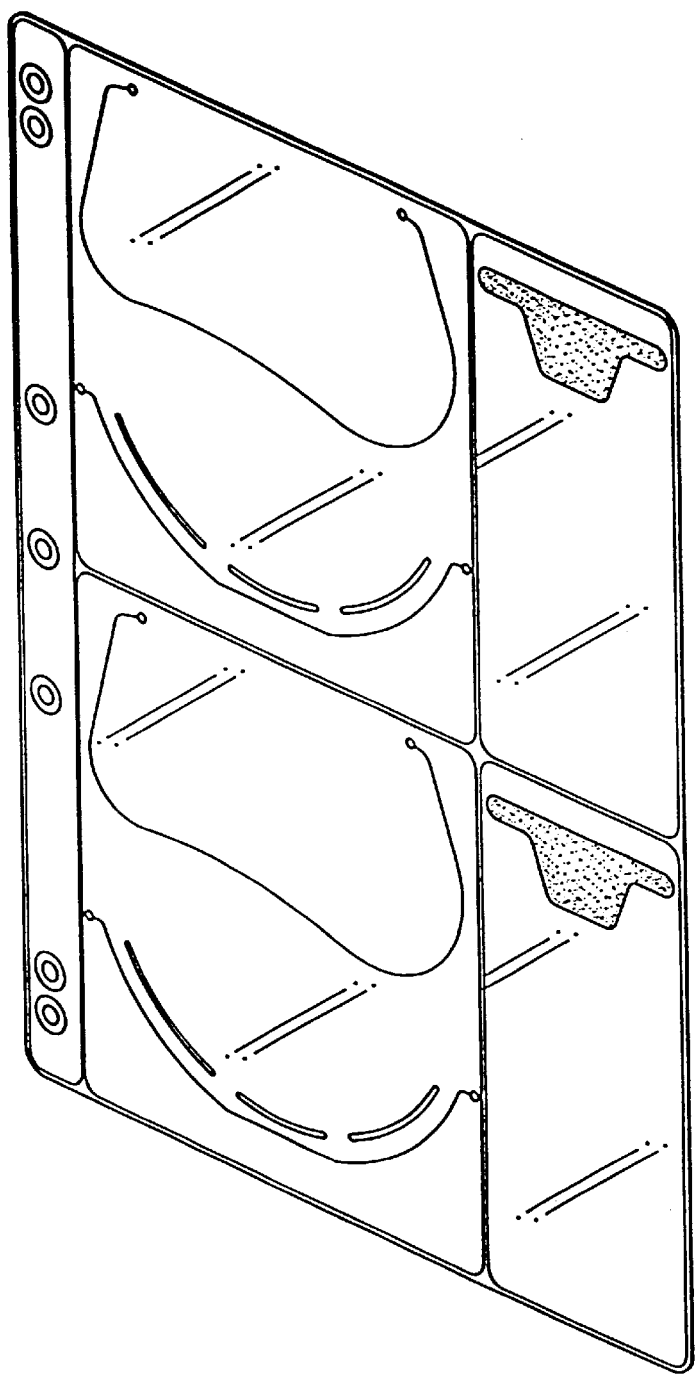
FIG. 8 is a CD PACK according to the prior art.

Referring to FIGS. from 1 through 3, an individual CD file 10 is shown comprised of two symmetrical shells 11, and a hinge strip 12 formed integral with and connected between the shells 11. The shells 11 each comprise a hub 113 or socket 116, a keeper 112 or annular groove 117 disposed around the hub 113 or socket 116, an annular recess 111 disposed around the keeper 112 or annular groove 117, a bearing flange 114 disposed around the inner diameter of the annular recess 111, a peripheral flange 115 disposed around the outer diameter of the annular recess 111, and a peripheral finger notch 1151 on the peripheral flange 115. The hub 113 of one shell 11 is a split hub having crossed splits 1131. The size of the annular recess 111 is approximately equal to a CD (compact disk). The height of the bearing flange 114 is smaller than the peripheral flange 115.

When loading a CD, the keeper 112 is inserted into the center hole of the CD, enabling the CD to be held in one shell 11 and supported on the bearing flange 114, and then the shells 11 are closed. When the shells 11 are closed, the split hub 113 and keeper 112 of one shell 11 are respectively engaged into the socket 116 and annular groove 117 of the other, keeping the shells 11 retained together in the closed condition, and the loaded CD is firmly retained between the bearing flanges 114 of the shells 11.

When taking out the CD from the individual CD file 10, the fingers are positioned in the finger notches 1151 on the peripheral flanges 115 of the shells 11 and then pulled in the reversed directions to open the shells 11. When opened, the CD can than be conveniently taken away from the keeper 112 at one shell 11 with the fingers.

FIGS. from 4 through 6 show an alternate form of the individual CD file. According to this alternate form, the shells 11 each comprise The shells 11 each comprise a split hub 113 or socket 116, a keeper 112 disposed around the split hub 113 or socket 116, an annular recess 111 disposed around the keeper 112, a bearing flange 114 disposed around the inner diameter of the annular recess 111, a peripheral flange 115 disposed around the outer diameter of the annular recess 111, and a peripheral finger notch 1151 on the peripheral flange 115. Further, the split hub 113 may be peripherally flanged for positive positioning in the socket 116. This alternate form is designed for keeping two individual CDs. The use of this alternate form is same as the embodiment shown in FIGS. from 1 through 3.

It is to be understood that the drawings are designed for purposes of illustration only, and are not intended for use as a definition of the limits and scope of the invention disclosed.

What the invention claimed is:

1. An individual CD file comprising a first shell, a second shell, and a hinged strip formed integral with and connected between said first shell and said second shell, wherein said first shell comprises a hub at the center, a keeper disposed around said hub for holding a CD (compact disk) in said first shell, an annular recess disposed around said keeper, and a peripheral flange disposed around the outer diameter of the annular recess of said first shell; said second shell comprises a socket at the center for receiving the hub of said first shell to hold said first shell and said second shell in a closed position, an annular recess disposed around said socket corresponding to the size of a CD (compact disk), and a peripheral flange disposed around the outer diameter of the annular recess of said second shell.

2. The individual CD file of claim 1 wherein said hub is a split hub having crossed splits.

3. The individual CD file of claim 1 wherein the peripheral flange of each of said first shell and said second shell has at least one peripheral finger notch.

4. The individual CD file of claim 1 wherein said second shell comprises a keeper disposed around said socket for holding a CD (compact disk) in said second shell.

5. The individual CD file of claim 1 wherein said second shell comprises an annular groove disposed around said socket for receiving the keeper of said first shell when said first shell and said second shell are closed together.

6. The individual CD file of claim 1 wherein said first shell and said second shell each comprise a bearing flange disposed around the inner diameter of the respective annular recess for supporting the CD (compact disk) being fastened to said keeper.

7. The individual CD file of claim 1 wherein said hub of said first shell is peripherally flanged for positioning in said socket of said second shell.

* * * * *